United States Patent
Schneider et al.

(10) Patent No.: US 9,242,731 B2
(45) Date of Patent: Jan. 26, 2016

(54) HOUSING-FREE HATRACK

(75) Inventors: Uwe Schneider, Jork (DE); Andreas Jespersen, Buxtehude (DE); Thorsten Gerber, Hamburg (DE)

(73) Assignee: Airbus Operations GmbH (DE)

( * ) Notice: Subject to any disclaimer, the term of this patent is extended or adjusted under 35 U.S.C. 154(b) by 9 days.

(21) Appl. No.: 13/589,516

(22) Filed: Aug. 20, 2012

(65) Prior Publication Data

US 2013/0026293 A1 Jan. 31, 2013

Related U.S. Application Data

(63) Continuation of application No. PCT/EP2011/051055, filed on Jan. 26, 2011.

(60) Provisional application No. 61/306,225, filed on Feb. 19, 2010.

(30) Foreign Application Priority Data

Feb. 19, 2010 (DE) .......................... 10 2010 008 622

(51) Int. Cl.
*B64D 11/00* (2006.01)

(52) U.S. Cl.
CPC .............. *B64D 11/003* (2013.01); *Y02T 50/46* (2013.01)

(58) Field of Classification Search
CPC ........ B64C 1/00; B64D 11/00; B64D 11/003; B64D 2011/0046; B60R 5/00; Y02T 50/46

USPC ......... 244/118.5, 129.1, 118.1; 312/326, 327, 312/328; 296/37.8

See application file for complete search history.

(56) References Cited

U.S. PATENT DOCUMENTS

| | | | |
|---|---|---|---|
| 4,368,937 A * | 1/1983 | Palombo et al. .............. 312/325 |
| 5,108,048 A * | 4/1992 | Chang ........................ 244/118.1 |
| 6,769,831 B2 * | 8/2004 | Aquino et al. ................ 403/350 |
| 7,637,686 B2 * | 12/2009 | Wood et al. ................... 403/302 |
| 2003/0080247 A1 * | 5/2003 | Frazier ....................... 244/118.1 |
| 2004/0140398 A1 | 7/2004 | Lau et al. |
| 2006/0151668 A1 | 7/2006 | Scown |
| 2008/0055836 A1 * | 3/2008 | Lamoree et al. ............. 361/683 |
| 2008/0277527 A1 * | 11/2008 | Fokken et al. ............. 244/118.1 |
| 2011/0186681 A1 * | 8/2011 | Vine et al. .................. 244/118.5 |
| 2012/0145829 A1 * | 6/2012 | Stierle ........................... 244/131 |

FOREIGN PATENT DOCUMENTS

| | | |
|---|---|---|
| DE | 19946629 A1 | 4/2001 |
| DE | 102004043910 A1 | 3/2006 |
| DE | 102007030331 A1 | 1/2009 |
| DE | 102007032233 A1 | 1/2009 |

(Continued)

*Primary Examiner* — Tien Dinh
*Assistant Examiner* — Vicente Rodriguez
(74) *Attorney, Agent, or Firm* — Lerner, David, Littenberg, Krumholz & Mentlik, LLP

(57) ABSTRACT

A housing-free hatrack for a passenger cabin of an aircraft includes a hatrack body, at least one fixing brace and a support which is arranged between the hatrack body and one end of the fixing brace in such a way that the hatrack body is pivotable about a pivot axis. The other end of the fixing brace may be connected to a frame of an aircraft structure of the aircraft. This hatrack dispenses with the double-walled construction of conventional hatracks and the hatrack is therefore directly fixed to the structure of the aircraft.

11 Claims, 7 Drawing Sheets

(56) References Cited

FOREIGN PATENT DOCUMENTS

| | | |
|---|---|---|
| DE | 102008049639 A1 | 4/2010 |
| EP | 0514957 * | 11/1996 |
| WO | 2009003945 A1 | 1/2009 |
| WO | 2010037637 A2 | 4/2010 |

* cited by examiner

HOUSING-FREE HATRACK

The present application is a continuation of International Application No. PCT/EP2011/051055, published in German, which claims priority from U.S. Provisional Patent Application No. 61/306,225, filed on Feb. 19, 2010, and German Patent Application No. 10 2010 008 622.3, filed on Feb. 19, 2010, the disclosures of which are incorporated herein by reference.

FIELD OF THE INVENTION

The invention relates to a movable hatrack for a passenger cabin of an aircraft for example. In particular, the invention relates to a movable hatrack with a lightweight construction. The invention also relates to the use of a hatrack of this type in an aircraft.

BACKGROUND OF THE INVENTION

There are currently two different luggage compartment systems for aircraft cabins. There are non-movable luggage compartments (fixed bins) which take the form of a hatrack provided with a shutter facing the passengers. Alternatively, there are pivotable luggage compartments (movable bins) which take the form of a hatrack without a shutter which can be pivoted to face the passengers. All luggage compartments with a loading edge which can be moved in some way are known as "movable bins". A fundamental aspect of a movable hatrack is that the open loading position differs from the closed position.

The component that is fixed to the fuselage in a movable hatrack is the housing which acts, inter alia, to receive the bin/storage container body itself. In this case, it is possible to dispense with a shutter because the hatrack becomes a closed box when it is pushed into the housing. The main advantage of movable hatracks is the changeable position thereof—in the closed state they offer a greater sense of space and the lowered, open position makes it possible to load and empty them comfortably.

The fuselage and the housing are connected by connecting rods which are fixed between aircraft-side and housing-side fittings. The housing and the hatrack are directly connected by rotary supports or roller-guided rail systems, it being possible for the housing and the hatrack to be connected to form a pre-installed module.

An example of a movable bin which is pre-installed in a housing box as a hatrack module is disclosed in DE 10 2007 030331 A1 and WO 2009/003945 A1.

BRIEF SUMMARY OF THE INVENTION

An aspect of the present invention provides a low-weight hatrack. Another aspect of the present invention provides a hatrack which does not pose any additional danger to passengers in the event of a crash.

In general, a hatrack according to an embodiment of the present invention comprises a hatrack body, a fixing brace and a support between the hatrack body and the fixing brace. The hatrack body may be formed as a box with one open side. The fixing brace may, for example, be fixed to a frame of an aircraft structure. The fixing brace may have a correspondingly shaped fixing end for this purpose.

It should be noted that the fixing brace may take the form of a rod, trapezium or a planar shape. The fixing brace may also be a combination of a plurality of fixing braces forming a framework which is capable in particular of absorbing forces that arise.

The fixing brace further comprises a support end for receiving a support, the hatrack body being arranged on the support end of the fixing brace in such a way that the hatrack body is pivotable about at least one pivot axis.

Since hatracks in a passenger cabin of an aircraft are typically arranged transversely to the direction of flight, i.e. transversely to a longitudinal axis of the fuselage, the pivot axis of the hatrack body is substantially parallel to the longitudinal direction of the passenger cabin in the fuselage. The fixing brace will accordingly be arranged transversely to the longitudinal direction, between a support point of the hatrack body and preferably a frame of the aircraft structure, and can therefore absorb in particular the forces acting transversely to the direction of flight.

The use of fixing braces makes it possible to dispense with a closed housing for receiving a hatrack body. This leads primarily to a reduction in weight.

According to an embodiment of the invention, the hatrack also comprises a sliding block which is arranged adjacent to the fixing end of the fixing brace. Said sliding block is fixed to the fixing brace in such a way that it is arranged at the front in the direction of flight, opposite the lateral wall of the hatrack, with the result that, if the hatrack body were forced forward in a crash, it would be supported against the sliding block arranged adjacent to or even on the frame of the aircraft structure. In this way, it is possible to prevent the moments that arise on the fixing brace in a crash from destroying the fixing brace, and it is therefore possible to prevent the hatrack from being torn away from the aircraft structure. This in turn reduces the danger to passengers in the event of a crash.

The sliding block may be fixed to both the fixing brace and the hatrack body. The sliding block may also be formed so as to be integral with the fixing brace. According to a preferred embodiment, the sliding block is produced from a plastics material, for example polyamide, in such a way that the lateral wall of the hatrack body may be moved easily along the sliding block when the hatrack body is pivoted between an open and a closed position.

It is also possible to provide a gap between a sliding block and the hatrack body in such a way that the hatrack body can be moved on the fixing brace and past the sliding block without contact. In the event of a crash, a slight deformation of the fixing brace would ensure that the hatrack body contacts the sliding block and that therefore the forces acting in the direction of flight would in turn be channelled into the aircraft structure via the sliding block.

According to an embodiment of the invention, the hatrack body comprises a locking latch, it being possible to lock the hatrack body in a closed position using the locking latch. The primary purpose of a locking latch of this type is to prevent the hatrack body from being opened accidentally. The locking latch may either engage in a corresponding notch in the fixing brace if the locking latch is arranged laterally on the hatrack body, or may engage directly in a notch in the frame of the aircraft structure if the locking latch is arranged on the rear or a lateral edge of the rear of the hatrack body.

In order to increase the level of comfort when actuating the hatrack body, i.e. when opening or closing the hatrack body, a damper may be provided and arranged between the fixing brace and the hatrack body. It should be noted that the damper may be a passive piston damper. Alternatively, the damper may also be an active member which on the one hand softens the speed of movement during opening and closing and on the other also provides active power assistance for the actuation of the hatrack body.

To further increase the level of safety in the event of a crash, the fixing brace of the hatrack may comprise an articulation point adjacent to the fixing end, the articulation point being formed in such a way that the fixing brace folds or is bent in the direction of flight when a force acts on said brace in the direction of flight. An articulation point of this type may be formed as a hinge over which no force can be transferred in the direction of flight. The articulation point of the fixing brace may, however, also be formed with a tapered cross-section, a kind of film hinge, in such a way that a predetermined bending point is formed when a force acting in the direction of flight arises.

In order to increase the rigidity of the hatrack body, a handle strip may be integrally formed on the front of the hatrack body. This can be achieved either by an extruded hollow profiled part or by connecting a handle-strip-shaped polyurethane foam profiled part with a honeycomb core arranged between two face sheets. The rigidity of the hatrack body is increased by the integrally formed handle strip on account of the geometry thereof, with the result that the wall thickness of the hatrack body can be reduced and therefore the weight can also be reduced.

These aspects described above may be implemented both in a hatrack comprising a hatrack body which is pivotable about a defined axis, and in a hatrack comprising a hatrack body which can be moved along a guide rail in both a translational and a rotational manner.

According to an embodiment of the invention, an aircraft comprises a hatrack with the features described above. The aircraft may further comprise a covering panel arranged above the hatrack in the passenger cabin of the aircraft. The covering panel may, at the lower edge thereof, comprise a portion which extends in the direction of the aircraft structure. This portion of the covering panel, which is not visible from the passenger cabin, may be shaped in such a way that the hatrack body, when in the closed state, forms a closed box together with said portion. By this means, it is possible to prevent objects in the hatrack body for example from catching behind the covering panel.

The aspects described above and further aspects, features and advantages of the invention may also be found in the example embodiments described below with reference to the appended drawings.

DETAILED DESCRIPTION

The main challenge in accommodating a movable hatrack is the limited installation space available for movement mechanisms, and the fact that the module weight is almost doubled due to the corresponding doubling of the sandwich surface. A housing is typically a closed drawer with a contour open towards the passengers, and a hatrack body is a smaller closed drawer with a contour open towards the passengers, located within the housing. This double-walled construction, including the required gap for movement and the movement mechanism, leads to a considerable loss of usable load volume in comparison with fixed hatracks (fixed bins) of the same size.

The same applies to the module weight, since the double-walled construction, including the required movement mechanisms, leads to a considerable increase in weight in comparison with movable bins of the same size using conventional movement mechanisms.

It is now proposed according to an embodiment of the invention that the double-walled construction of a movable hatrack (movable bin) be dispensed with and that the hatrack body be secured directly to the structure which, with an intelligent layout, means that a movable hatrack can be achieved with the same weight and loading volume as a fixed bin.

It is thereby advantageously possible for all the faces of a conventional hatrack module which are visible to the passenger to be retained. It is further possible for all the requirements placed on a conventional hatrack module with regard to rapid and simple assembly to be satisfied. The requirements of a conventional hatrack module with regard to loading characteristics and reliability are also satisfied. Furthermore, the provision of passenger supply functions also remains unimpaired.

It is thus possible for the loading volume of movable hatracks to be increased and the weight almost halved through the use of the "housing-free hatrack" according to an embodiment of the invention with identical external dimensions, without passengers and manufacturers having to contend with any evident drawbacks.

Furthermore, with regard to installation times, this "housing-free hatrack" may be installed using a quick-lock system, either through the use of rollers at the side of the structure which are inserted into axial quick-lock recesses on the hatrack body or through the use of rails. This further accelerates the time required for installation in the final cabin assembly process.

The hatracks described in this document dispense with the double-walled construction and are therefore fixed directly to the structure of the aircraft. Hatrack bodies which are pivotable about a fixed rotary support are installed for example with a quick-lock system, by means of rollers which are mounted on the structure and are clipped into internal axial quick-lock recesses.

Figure 1:
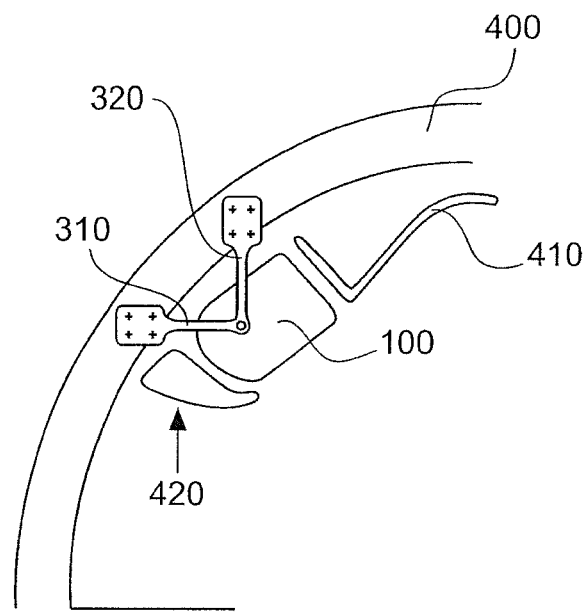
FIG. 1 is a schematic side view of a hatrack according to a first embodiment of the invention.
Figure 2:
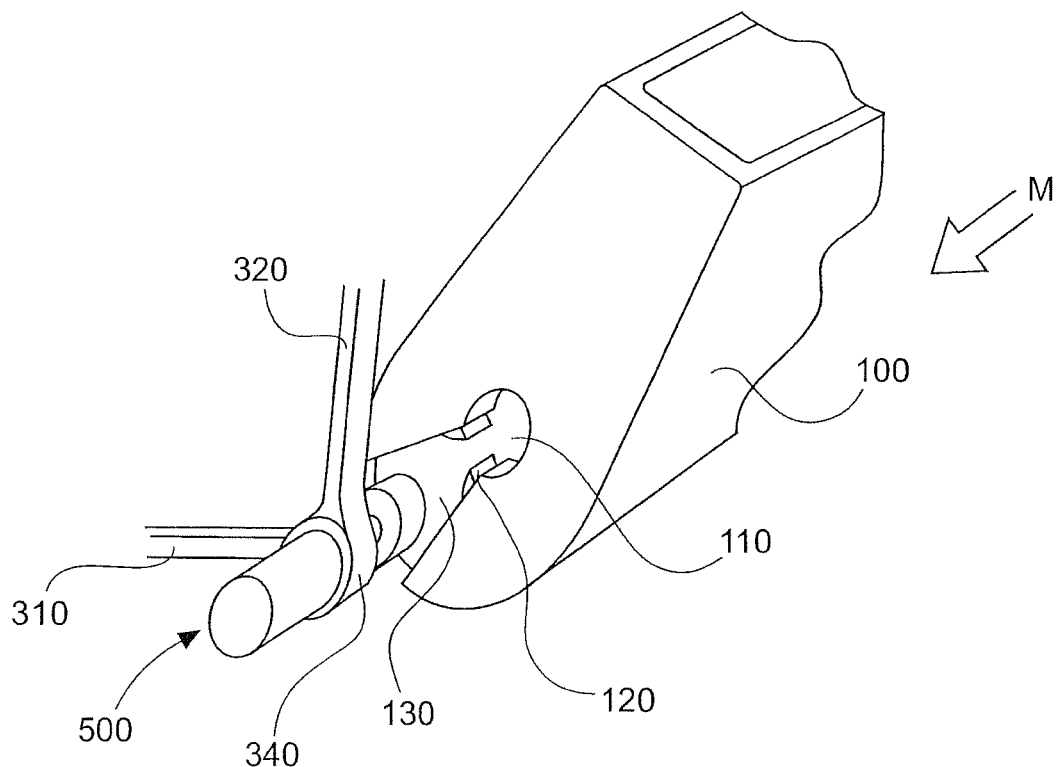
FIG. 2 is a detail of the bearing of the hatrack from FIG. 1.

FIG. 1 is a side view of a hatrack according to a first embodiment of the invention. FIG. 2 is an isometric detail of the support of the hatrack body to the fixing brace of the hatrack from FIG. 1. The lateral wall of the hatrack body 100 comprises a notch 110 for receiving a support roller. In order to secure the support roller in the notch 110, axial grippers 120 are provided which make it possible to lock a support roller into place, in the manner of a snap-fit closure, when the hatrack body 100 is pushed into its assembly position. The grippers 120 may be spring-biased.

To enable the hatrack body 100 to be inserted more easily, an insertion incline 130, i.e. a conical region extending towards the rear end of the hatrack body, may be provided. According to this embodiment, after the fixing brace 310 has been fixed in the horizontal direction and the fixing brace 320 has been fixed in the vertical direction to a frame 400 of the aircraft structure, the hatrack body 100 may, via the insertion (assembly) incline 130 thereof, initially be pushed in the assembly direction M onto a roller at the support point 340 of the fixing braces 310 and 320 and then locked in place by being pushed further over the grippers 120 into the notch 110. In this way, an axially pivotable hatrack body may be fitted easily between a supply duct 420 and a covering panel (ceiling lining) 410.

Figure 3:
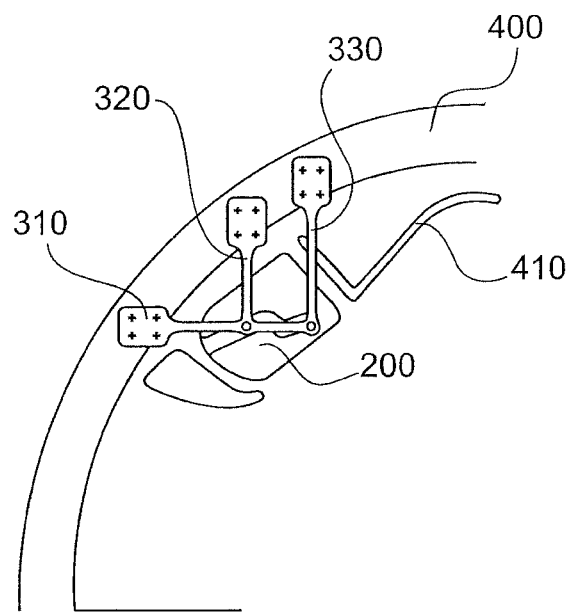
FIG. 3 is a schematic side view of a hatrack according to a second embodiment of the invention.
Figure 4:
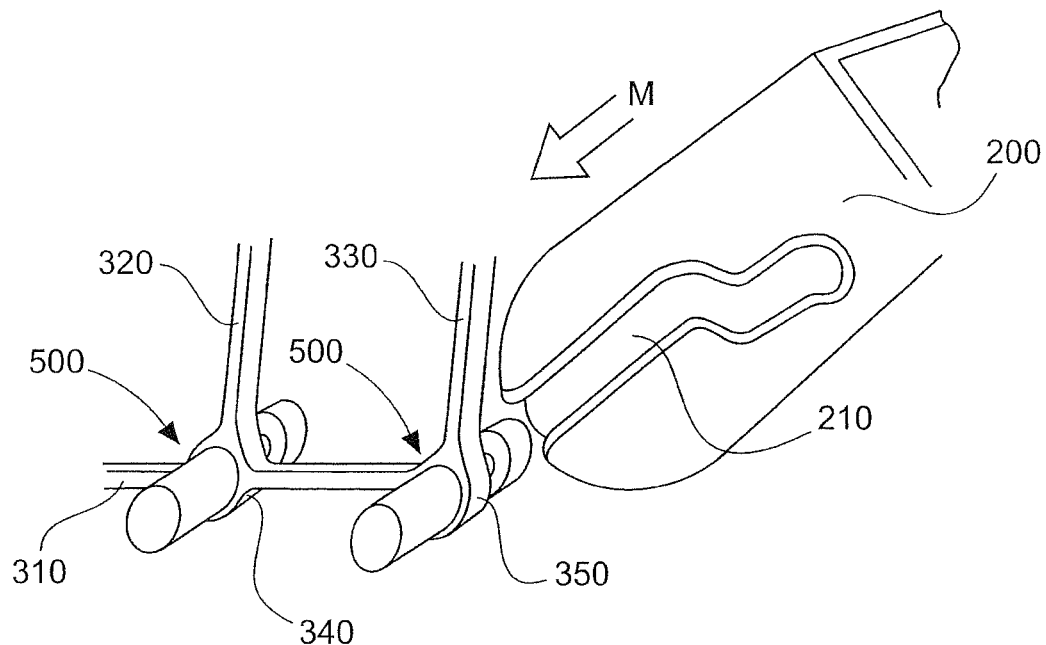
FIG. 4 is a detail of the support of the hatrack from FIG. 3.

FIG. 3 shows a hatrack according to a second embodiment of the invention. FIG. 4 is an isometric view of the bearing of the hatrack body 200 of the hatrack from FIG. 3 on support 500. A horizontal fixing brace 310, a vertical fixing brace 320 and a further vertical fixing brace 330 are fixed to a former 400 of an aircraft structure. The fixing braces 310, 320 and 330 form a framework, in which bearing points 340 and 350 are formed at the respective connection points between the braces 310 and 320, and 310 and 330 respectively. Provided at each of the two bearing points are support 500, both of which are able to engage in a rail 210 formed in or set into the lateral wall of the hatrack body 200.

In a manner comparable to the first embodiment, it is also possible in this case for the hatrack body 200 to be pushed in the assembly direction M via insertion inclines for example, initially onto the first roller at the support point 350, and then pushed further onto the further roller at the support point 340. The interaction between the two support points and the correspondingly arranged rollers, and the particular shape of the rails make it possible for the hatrack body to move in a complex manner, both translationally and rotationally.

This thus ensures rapid, simple assembly in a single step, with no time-intensive modification or readjustment required. A common feature of both principles is that the rollers which engage in the hatrack body at the support points take the form of fixed supports at the front and loose supports at the rear in the direction of flight.

Figure 5:
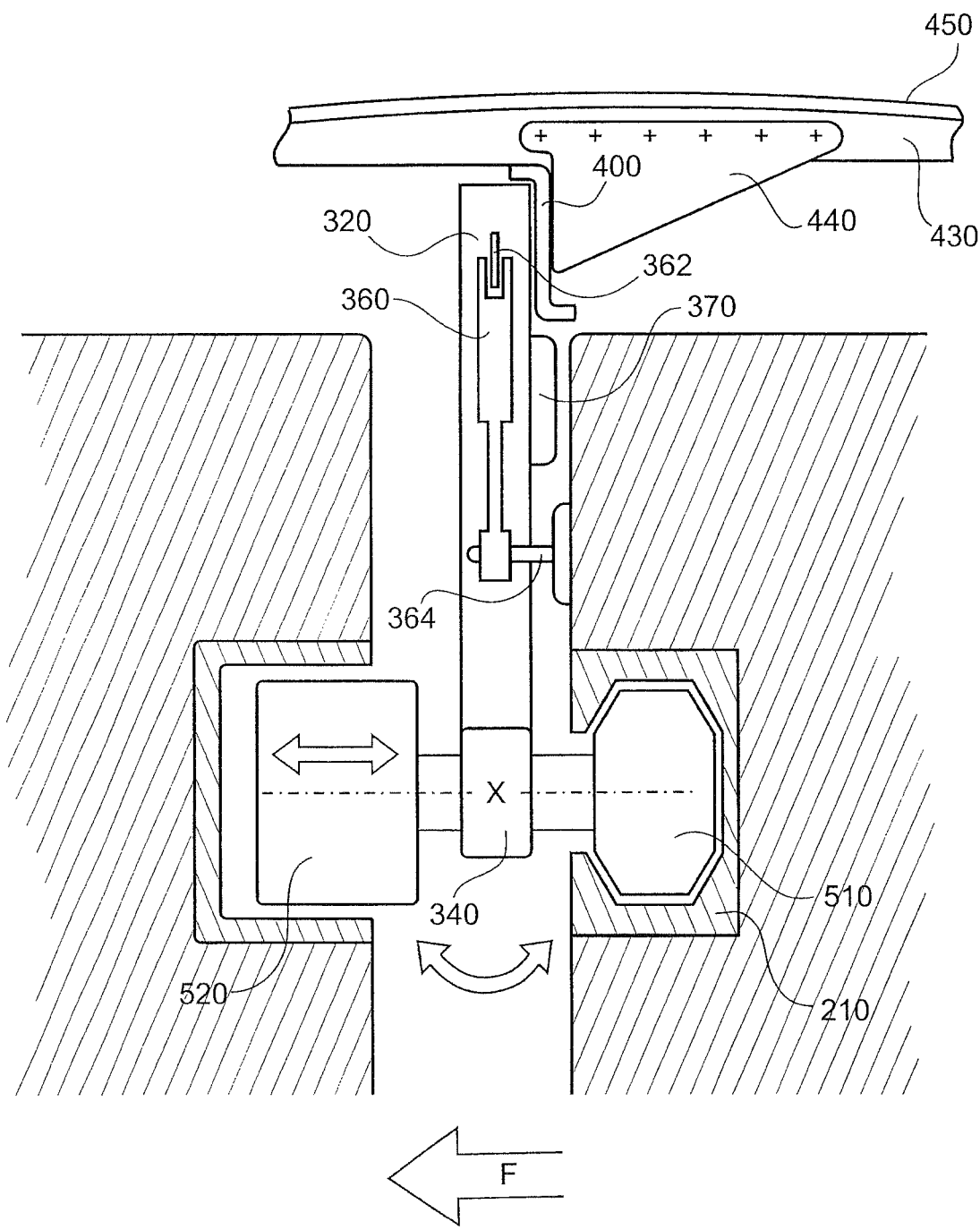
FIG. 5 is a plan view of a fixing brace between two hatracks.

As shown in FIG. 5, the support 500 on one side of the fixing brace have a roller 510 with a shape that can form a fixed bearing and on the other side have a roller 520 which can form a loose bearing. For this purpose, the roller 510 is for example formed with lateral inclined faces which engage in a rail 210 with corresponding inclined faces. In contrast, the rollers 520 may be formed as smooth rolling members which engage in a rail which does not have any undercuts and therefore does not allow the roller to be gripped in the axial direction.

The fixed support is capable of absorbing loads which arise in the direction of flight, the loose support not being able to absorb loads of this type in the direction of flight but being able to compensate even for major structure-related and hatrack-related manufacturing tolerances. The support that actually functions as a guide is therefore located at the front in the direction of flight, with the rear loose support only acting as a guide transversely to the direction of flight. "Bending moments" arising about the support axis are compensated or neutralised, since the fixing brace framework is not subjected to bending forces on both sides because a hatrack body is received on the left- and right-hand sides at the same time.

FIG. 5 further illustrates a possible way to fix the fixing brace 320 to a frame 400. The frame 400 is fixed for example to a stringer 430 by a member 440. The stringer 430 in turn forms the supporting structure for the outer shell 450 of the aircraft.

FIG. 5 also shows a damper 360 which is fixed to a fixing point 362 on the fixing brace 320 and is also fixed to the hatrack body by a fixing member 364. The damper 360 shown in this figure is formed as a piston damper. The piston damper 360 integrated into the fixed bearing framework cushions the hatrack body during the opening process and can be fitted easily to the hatrack body in the open position. The rollers 510 and 520 are riveted to the structural frame 400 by a metal intermediate framework, i.e. the fixing braces 310, 320 and optionally 330.

Finally, a sliding block 370, which is arranged between the fixing brace 320 and the hatrack body, is also shown in FIG. 5.

Figure 6:
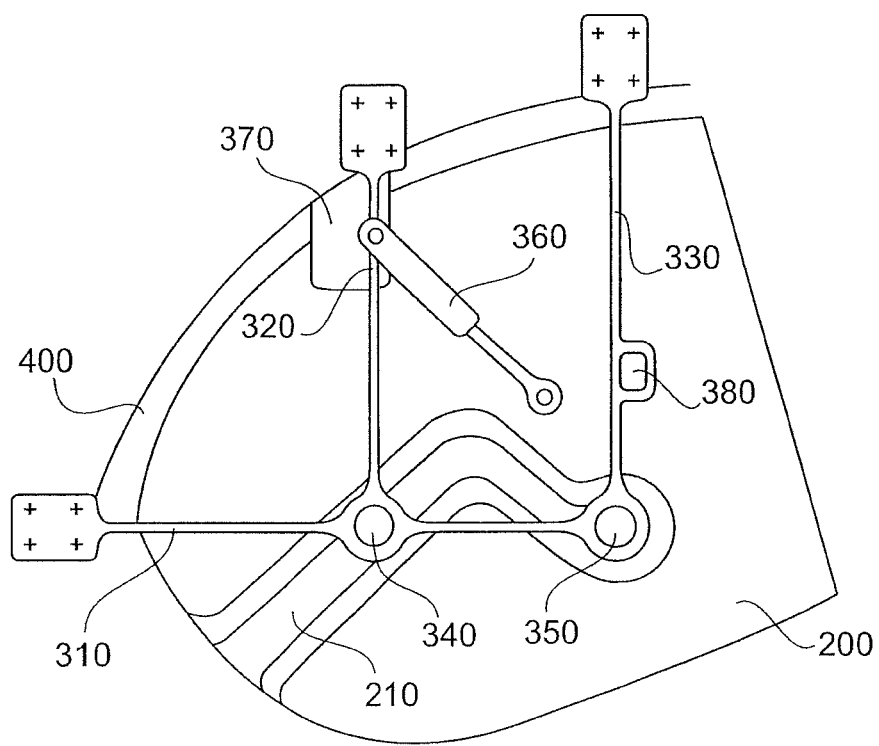
FIG. 6 is a side view of a hatrack according to the second embodiment of the invention.

FIG. 6 is also a side view of a hatrack according to the second embodiment of the invention. The horizontal fixing brace 310, together with the vertical fixing brace 320, forms a first support point 340. The fixing brace 310, together with the vertical fixing brace 330, also forms a second support point 350. A sliding block 370 is provided on the vertical fixing brace 320 adjacent to the frame 400. In addition, one end of the piston damper 360 is fixed to the fixing end, i.e. the end of the fixing brace riveted to the frame 400. The other end of the piston damper is fixed to the hatrack body 200. The illustration also shows a latch mechanism 380 for locking the hatrack body 200 in a closed position. According to this embodiment, a locking latch which can engage in the latch mechanism 380 is provided on the lateral wall of the hatrack body 200. Finally, a rail 210 which engages with supports at the support points 340 and 350 is provided in the lateral wall of the hatrack body 200.

The locking latch which engages in the latch mechanism 380 may be actuated from a central handle via control cables. The locking latches may be acted upon on one side by a spring mechanism in such a way that they catch automatically when the hatrack body is closed and must be released to open the hatrack.

Figure 7:
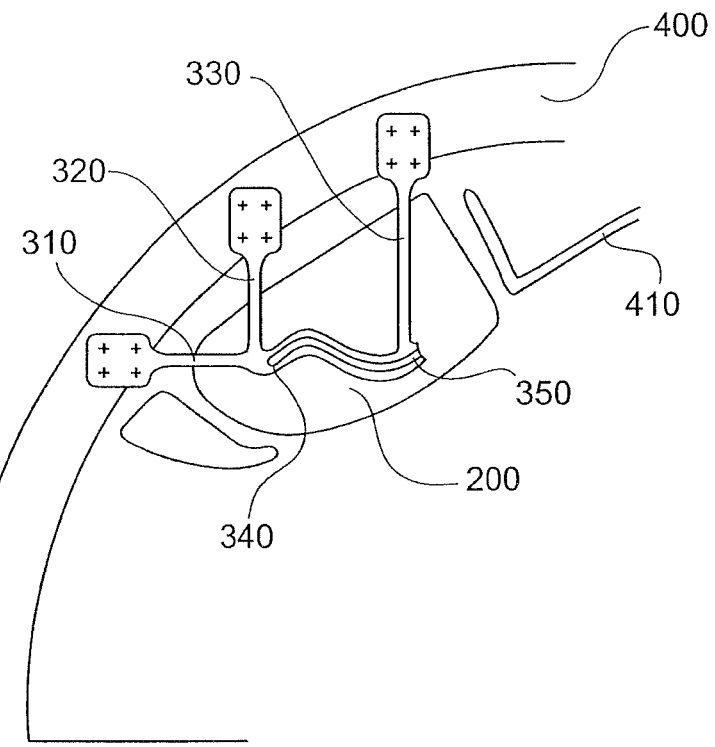
FIG. 7 is a side view of a variant of a hatrack according to the second embodiment of the invention.

According to an alternative embodiment shown in FIG. 7, if the hatrack body is guided on rails, the rail may be part of the fixing braces in such a way that the rollers which engage in said rails can be provided on the side of the hatrack body 200.

Alternatively, the locking mechanism 380 may be integrated directly into the structural frame 400. An embodiment of this type is shown in FIG. 8, in which a locking latch 180 arranged on a lateral edge of the rear of the hatrack body 100 engages in the latch mechanism 380 in the frame 400.

Figure 8:
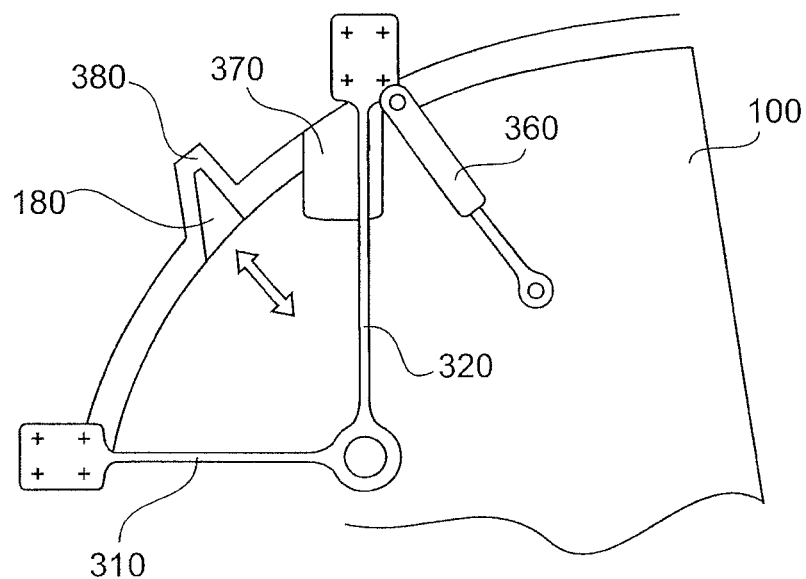
FIG. 8 is a side view of a hatrack according to the first embodiment of the invention.

The embodiment shown in FIG. 8 also has a horizontal fixing brace 310 and a vertical fixing brace 320. A piston damper 360 and a sliding block 370 are also shown in this figure.

According to this embodiment, the locking and latching forces acting on the locking latch 180 are not directed into the fixing framework, but are transferred directly into the structural frame 400, which allows the construction to be made more lightweight through load path optimisation.

Figure 9:
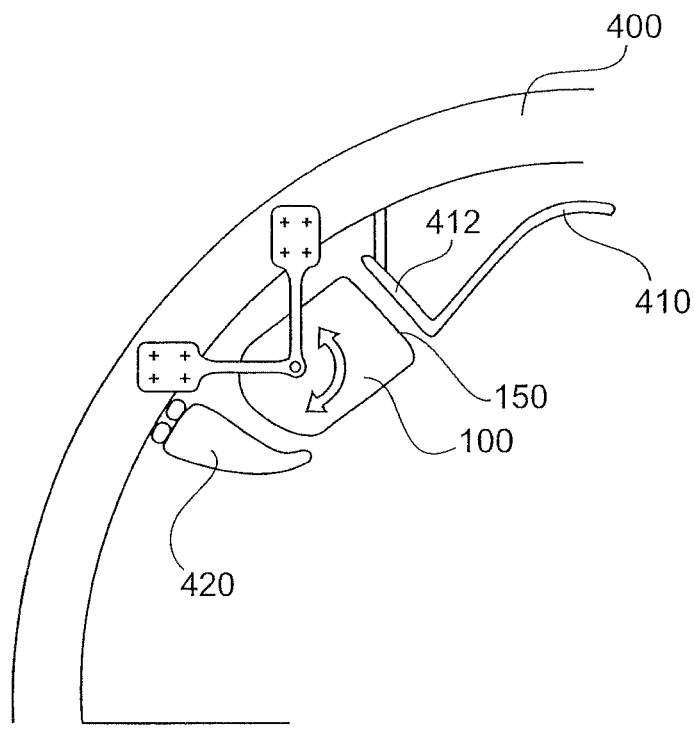
FIG. 9 is a further side view of a hatrack according to the first embodiment of the invention.

FIG. 9 shows the aspect in which a shutter on the hatrack body can be dispensed with if the hatrack forms a closed box when it is pushed into the ceiling covering. This can be achieved by forming a portion 412 on the covering panel 410 in such a way that it extends in the direction of the aircraft structure. Said portion 412 forms a boundary part for the hatrack body 100, i.e. the open side 150 of the hatrack body 100 is closed by the portion 412 of the covering panel 410.

By enlarging the conventional construction thereof, the covering panel assumes the locking function performed by the housing in conventional hatracks, and is directly fixed to the structural frame, which in turn decreases the weight of the ceiling assembly.

FIG. 9 further shows a supply duct 420 in which passenger supply functions (oxygen, reading light, passenger air, flight attendant call and loudspeaker) may be provided. The supply duct 420 may be fixed directly to structural rails, which in turn separates the supply duct assembly from the hatrack body assembly and therefore the weight thereof is decreased. The contour of the supply duct 420 forms the lower boundary to the hatrack body. The supply duct has no direct mechanical connection to the hatrack body. All of the surfaces of a conventional hatrack module which are visible to a passenger are thereby retained.

Figure 10:
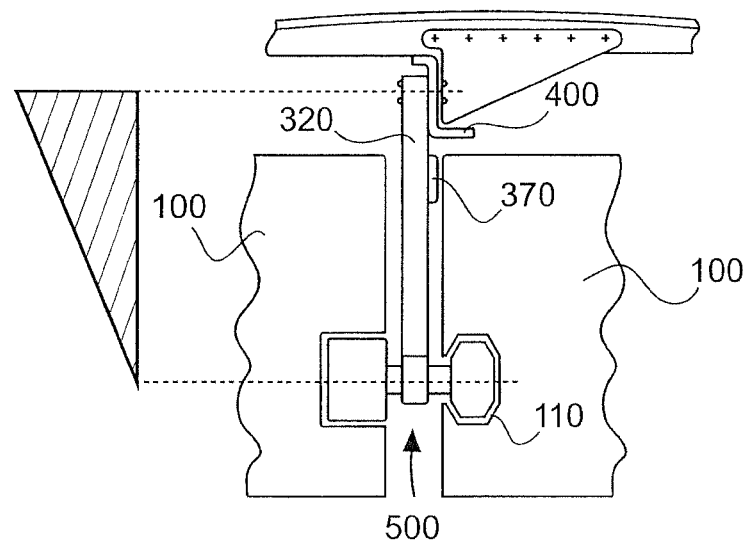
FIGS. 10 to 12 are views which demonstrate how moments arise in a fixing brace in different configurations.
Figure 11:
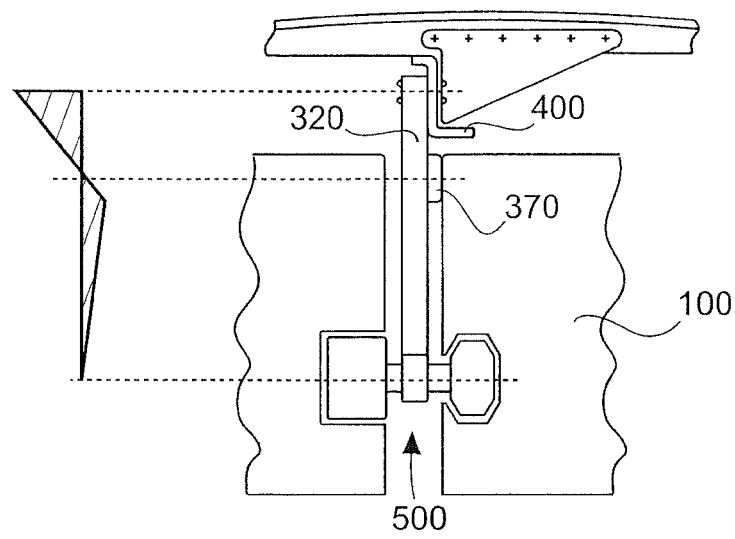
Figure 12:
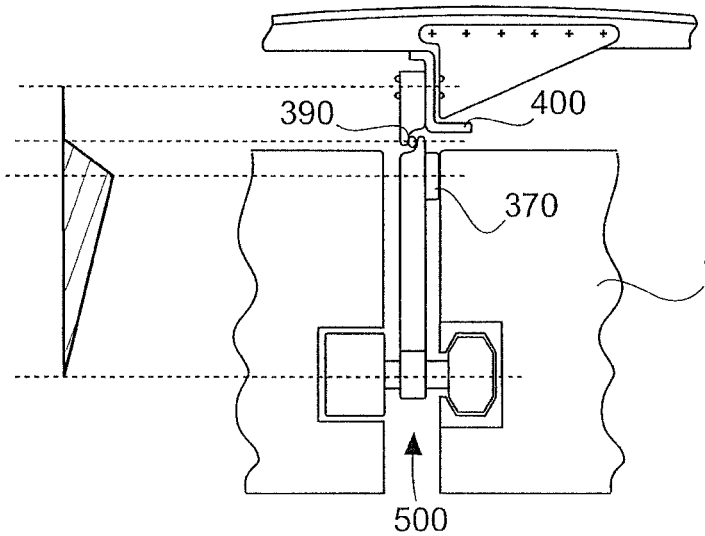

In the following, unacceptable bending loads which arise in the frames, such as crash loads in the direction of flight, will be described in particular. In FIGS. 10, 11 and 12, bending loads on the framework or the structural frames are limited directly by corresponding contact faces for the hatrack body. In the event of a crash, at t=0 the crash loads are transferred into the intermediate framework via the guide rollers and, on account of the long lever arm to the rigid riveting on the frame (FIG. 10), generate a maximum moment.

In this case, the intermediate framework deforms in the direction of flight until the face of the sliding block 370 in the proximity of the frame comes into contact with the hatrack body 100 (FIG. 11). The shortening of the lever arm and the transfer of the moment to the guide roller at t>0 leads to a reduction and partial neutralisation of the moment which has to be transferred into the frame. The structural load would therefore lie within an acceptable range. It should be noted that "crash loads" are only observed when the hatrack bodies are closed and therefore, owing to this limited deformation, do not lead to the failure of the system.

Alternatively, an articulation point 390, for example a rotary support, may be integrated into the intermediate framework. In this case, the moment introduced into the frame is reduced to zero, but the bending forces in the intermediate framework increase (FIG. 12).

A balance between the configurations shown in FIGS. 11 and 12 may be struck through the use of a defined, predetermined bending point. If this predetermined bending point is arranged approximately at the position of the rotary support, the moments transferred to the frame are as low as with the rigid fixing brace, and although the moments in the fixing brace are slightly higher than with the rigid structural shape, they are lower than if a rotary support were provided.

Figure 13:
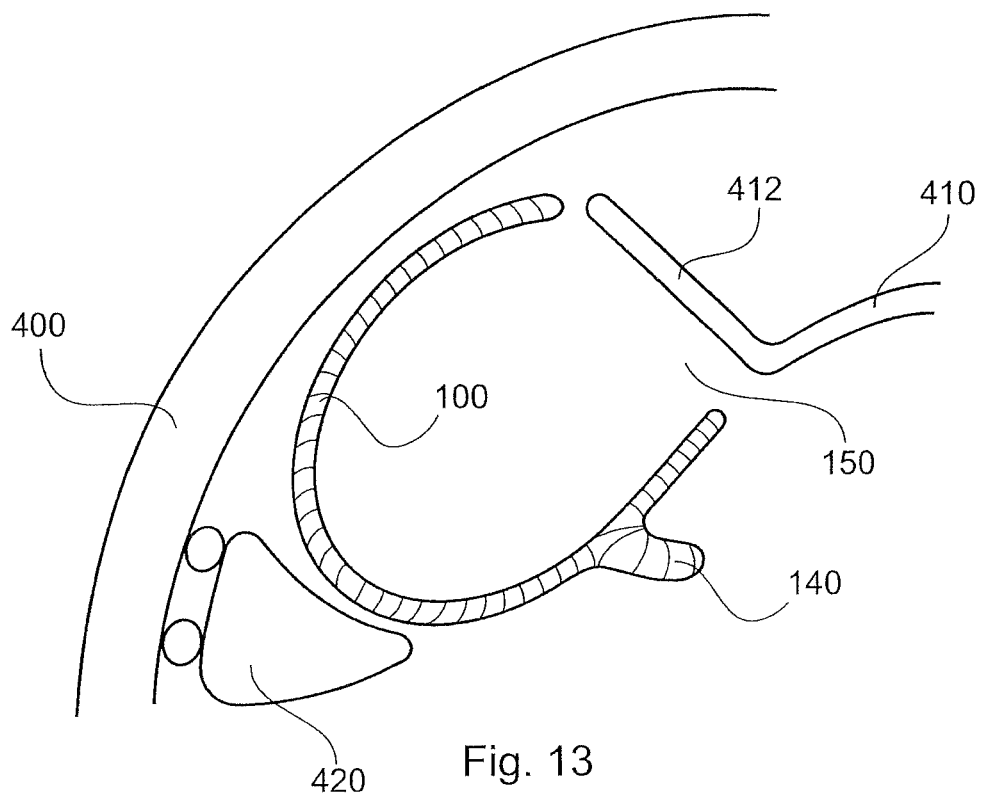
FIGS. 13 and 14 are sectional views of hatrack bodies according to further embodiments of the invention.

As shown in FIG. 13, in an embodiment of the hatrack body, a handle strip 140 may be integrated by being integrally moulded, in one step, in the form of an extruded hollow profiled part, and may thus bring about further reinforcement of the hatrack base and consequently contribute to a further decrease in weight.

Figure 14:
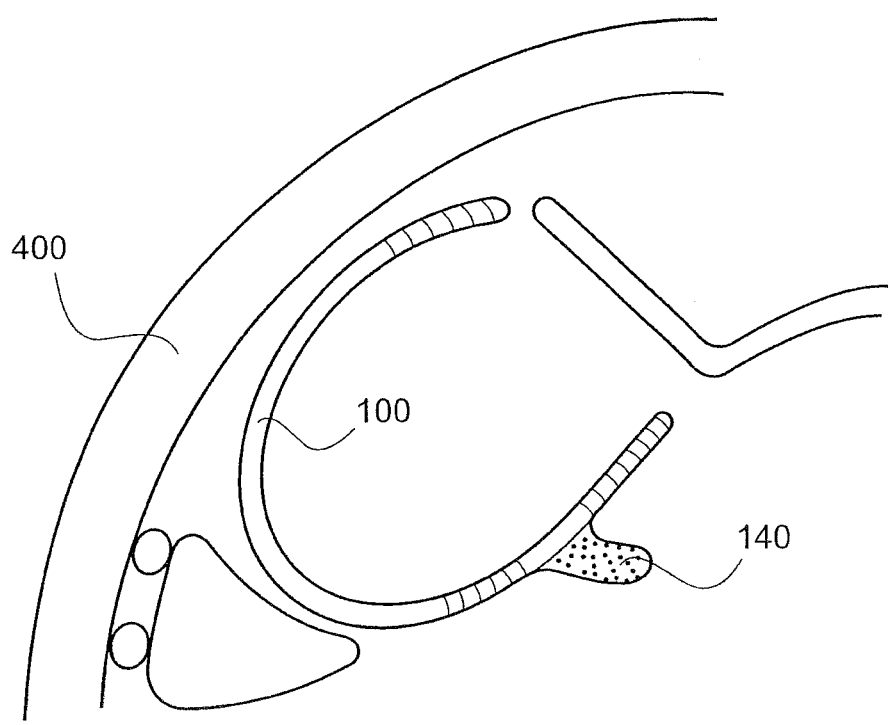

Alternatively, as shown in FIG. 14, a handle strip 140 may, in an embodiment of the hatrack body, be integrated as a sandwich module in a component. In this case, an inner cover face is initially placed in position and a honeycomb core is then placed over it and adhesively bonded to a handle-strip-shaped polyurethane foam profiled part. Finally, an outer cover face is placed over it and the entire semi-finished product is adhesively bonded in an autoclave. As a result, the hatrack body base is reinforced without increasing the weight thereof, and consequently allows a further decrease in weight.

While the invention has been illustrated and described in detail in the drawings and the above description, said illustrations and descriptions are merely intended to be illustrative or examples and are not restrictive, and therefore the invention is not limited by the disclosed embodiments. Other variations of the disclosed embodiments may be conceived and achieved by a person skilled in the art by modifying the claimed invention following a review of the drawings, disclosure and appended claims.

In the claims, the term "comprising" does not exclude other members or steps and the indefinite article "a" or "an" does not preclude a plurality.

The mere fact that particular features are specified in different dependent claims does not limit the subject-matter of the invention. Any desired combinations of said features may also be advantageously used. The reference numerals in the claims are not intended to limit the scope of the claims.

List of Reference Numerals
100, 200 Hatrack body
110 Notch
120 Gripper
130 Insertion incline
140 Handle strip
150 Open side of the hatrack body
180 Locking latch
210 Guide rail
310, 320, 330 Fixing brace
340, 350 Support point
360 Piston damper
370 Sliding block
380 Latch mechanism
390 Articulation point
400 Frame
410 Covering panel
412 Portion of the covering panel
420 Supply duct
500 Support
510 Fixed support roller
520 Loose support roller

The invention claimed is:

1. A hatrack for a passenger cabin of an aircraft, comprising:
   a hatrack body;
   at least one fixing brace with a fixing end, a support end and at least one roller extending at the support end; and
   a support;
   wherein the support is arranged between the hatrack body and the support end of the fixing brace in such a way that the hatrack body is pivotable about a pivot axis;
   wherein the pivot axis is arranged parallel to the longitudinal direction of the passenger cabin;
   wherein the fixing end of the fixing brace is connectable to a frame of an aircraft structure of the aircraft, and
   wherein the hatrack body comprises a first and a second opposing lateral walls configured to releasably engage the corresponding at least one roller in such a way that the hatrack body is pivotable about an axis defined by the roller.

2. The hatrack according to claim 1, further comprising a sliding block for absorbing forces in the direction of the pivot axis, wherein the sliding block is arranged adjacent to the fixing end of the fixing brace.

3. The hatrack according to claim 1, wherein the hatrack body further comprises a locking latch, wherein the hatrack body is lockable in a closed position using the locking latch.

4. The hatrack according to claim 1, further comprising a damper, wherein the damper is arranged between the fixing brace and the hatrack body in such a way that a movement of the hatrack body is cushioned.

5. The hatrack according to claim 1, wherein a handle strip is formed on a front side of the hatrack body.

6. The hatrack according to claim 1, the at least one roller comprises a pair of rollers, and
wherein the hatrack body comprises a first and a second guide rail on each of a first and a second opposing lateral walls of the hatrack body, respectively, configured to releasably engage the corresponding pair of rollers in such a way that a movement of the hatrack body is determined by an interaction between the pair of rollers and the first and second guide rails.

7. The hatrack of claim 1, wherein at least one of the first and second lateral walls comprises a notch defined therein configured to releasably engage the at least one roller.

8. The hatrack of claim 7, wherein at least one of the first and second lateral walls comprises an insertion incline leading to the notch and configured to guide the roller therethrough to the notch.

9. The hatrack of claim 8, wherein the hatrack body further comprises a gripper configured to releasably secure the at least one roller within the notch.

10. The hatrack of claim 9, wherein the gripper is spring-biased.

11. An aircraft comprising a hatrack, the hatrack comprising:
a hatrack body;
at least one fixing brace with a fixing end, a support end and at least one roller extending at the support end; and
a support;
wherein the support is arranged between the hatrack body and the support end of the fixing brace in such a way that the hatrack body is pivotable about a pivot axis;
wherein the pivot axis is arranged parallel to the longitudinal direction of the passenger cabin;
wherein the fixing end of the fixing brace is connectable to a frame of an aircraft structure of the aircraft, and
wherein the hatrack body comprises a first and a second opposing lateral walls configured to releasably engage the corresponding at least one roller in such a way that the hatrack body is pivotable about an axis defined by the roller;
a covering panel for covering the aircraft structure above the hatrack, wherein the covering panel has a portion formed such that the hatrack body, in the closed position, is closed by the portion.

* * * * *